Aug. 23, 1966   M. H. HARWOOD   3,268,784
VARIABLE CAPACITOR AND ELECTRICAL CONNECTOR FOR USE THEREWITH
Filed Sept. 24, 1963
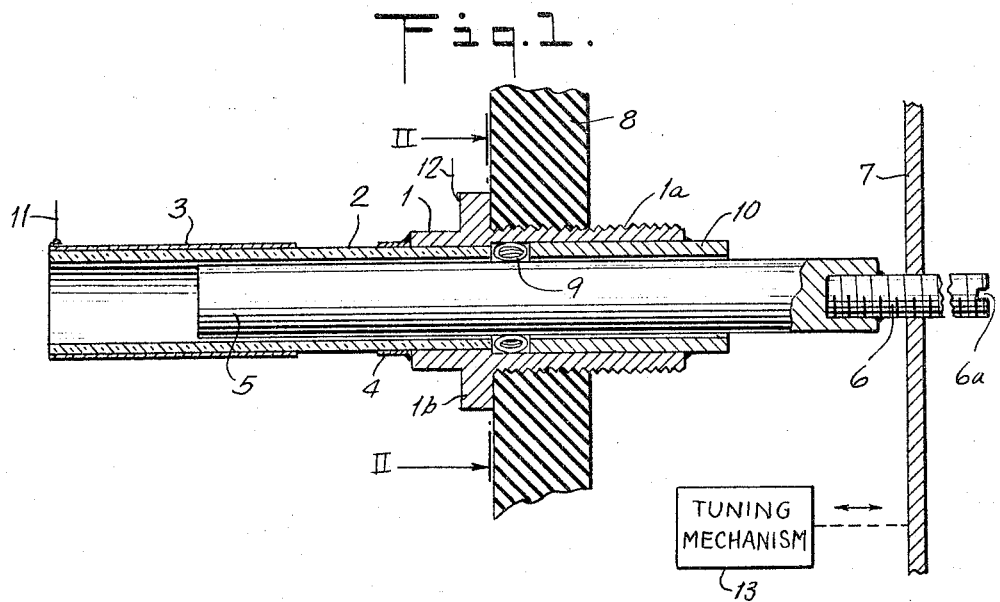
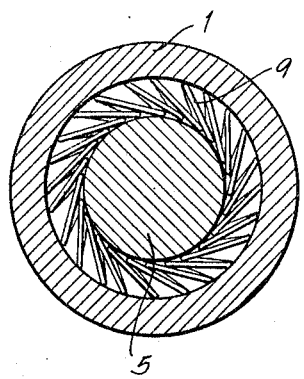
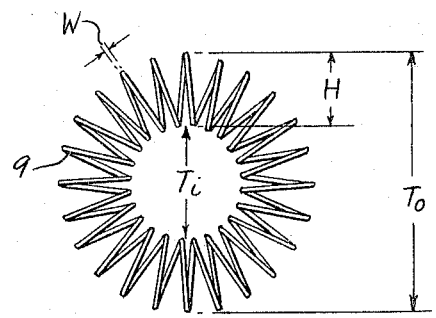
INVENTOR.
MARK H. HARWOOD
BY Lester N. Clark
ATTORNEY United States Patent Office 3,268,784
Patented August 23, 1966

3,268,784
VARIABLE CAPACITOR AND ELECTRICAL
CONNECTOR FOR USE THEREWITH
Mark H. Harwood, Syosset, N.Y., assignor to Roanwell
Corporation, New York, N.Y., a corporation of New
York
Filed Sept. 24, 1963, Ser. No. 311,089
1 Claim. (Cl. 317—249)

This invention relates to variable capacitors and to an electrical connector useful in such capacitors. While the connector of the invention has particular utility in a variable capacitor, it also has broader general utility in connection with other electrical devices.

A variable capacitor typically consists of one stationary and one movable electrode, separated by dielectric material, and provided with electrical connections to both electrodes. The present invention is concerned with the electrical connection to the movable electrode. It is desirable that such an electrical connection have low friction, so that the electrode may be readily adjusted from one position to another. It is further desirable that it remain positively in any position to which it is adjusted. In order that the capacitance of the capacitor may be adjusted with accuracy, without disturbances introduced by variations in the connection, it is desirable that the electrical connection have a low resistance, a low impedance and a high Q.

One common type of variable capacitor is known as a piston capacitor, and consists of: a mounting fitting, usually tubular and externally threaded for attachment to a support and provided with a peripheral flange for locating it on the support; a tube of dielectric material, typically glass, coaxial with the fitting and attached thereto; a stationary electrode in the form of a sleeve on the outside of the dielectric tube; a connection between the stationary electrode and a fixed terminal; a movable electrode in the form of a piston within the dielectric tube; and an electrical connection between the piston and another fixed terminal; the latter connection being commonly between the tubular fitting and the piston. This latter connection should fulfill all the requirements stated above for electrical connections to movable electrodes generally.

Capacitors intended for use in the ultra high frequency range, which may be defined as from 300 to 3,000 megacycles, are particularly troublesome in that the changes in position of the movable electrode may introduce changes in the inductance of the connection between the movable electrode and the associated fixed terminal.

Accordingly, it is an object of this invention to provide a variable capacitor with a low resistance, low impedance current conducting path between a relatively movable electrode and an associated fixed terminal.

It is a further object of this invention to provide a connecting device with a low resistance, low impedance current conducting path between two relatively movable conductor elements.

Another object of the invention is to provide an electrical connector comprising a coil spring laterally compressed between two conductor elements so that the coils are yieldably held in engagement with each other and with the conductor elements. A further object is to provide an electrical connector of the type described in which the two conductor elements are respectively a piston and a cylinder and the coil spring is a continuous toroid coil.

The foregoing and other objects of the invention are attained in the variable capacitor described herein. That capacitor is of the piston type and is supported on a mounting fitting provided with an external thread and an external locating flange. A glass sleeve coaxial with the fitting is attached to the fitting and extends from a point within the fitting adjacent the flange and spaced from one end of the fitting to a locality substantially beyond the other end of the fitting. On the outer side of the glass sleeve, adjacent the end thereof remote from the fitting, is attached an electrically conductive sleeve which serves as the fixed electrode of the capacitor. A piston of electrically conductive material is movable within the glass sleeve and constitutes the movable electrode. A helical spring in the form of a continuous toroid coil is compressed between the fitting and the piston at a point adjacent the flange on the fitting. The coil spring is held against movement in one axial direction by the end of the glass sleeve. It is held against movement in the other axial direction by an electrically conductive sleeve attached to the fitting.

The spring is in the form of a continuous toroid coil and is compressed laterally between the fitting and the piston so that the portions of the spring overlie one another and make light electrical contact with each other, and with the fitting and piston.

Other objects and advantages of the invention will become apparent from a consideration of the following specification and claim, taken together with the accompanying drawing.

In the drawing:

FIG. 1 is a central sectional view of a variable capacitor embodying the invention;

FIG. 2 is a sectional view taken on the line II—II of FIG. 1;

FIG. 3 is an elevational view of a continuous helical spring (seen laterally compressed in FIG. 2) as it appears in an unstressed condition.

Referring to the drawing, there is shown a mounting fitting 1 of tubular form, provided adjacent the right hand end with an external thread 1a. The fitting 1 is of electrically conductive material, e.g., brass. The left hand end of the thread 1a terminates at a flange 1b. The fitting 1 extends to the left beyond the flange 1b. A dielectric tube 2, which may be glass, extends from a point within the fitting 1 aligned with the flange 1b to the left, as shown in the drawing, and projects a substantial distance beyond the left end of the fitting 1.

A sleeve 3, which may be brass and which forms the stationary electrode of the capacitor, is attached to the outside of the tube 2, as by shrinking. Other suitable forms and other electrically conductive materials may be used for the stationary electrode and other suitable forms of attachment of such electrodes to the dielectric sleeve 2 may alternatively be used. Another brass sleeve 4 is shrunk on the dielectric tube 2 adjacent the left end of the fitting 1. The sleeve 4 is soldered to the fitting 1a and serves to attach the tube 2 to the fitting 1.

A piston 5 is movable inside the tube 2. The piston may be of any suitable electrically conductive material, such as brass. However, for capacitors of high accuracy, such as ultra high frequency tuning capacitors, it is desirable to make the piston of material having a low coefficient of thermal expansion, such as invar. At its right hand end, as viewed in the drawing, the piston 5 carries a stud 6 which is externally threaded for engagement with a movable member 7, and is provided at its right hand end with a screw slot 6a. The fitting 1 is attached for mounting in an external opening in a fixed panel 8. The member 7 is operatively connected to a suitable tuning mechanism 13, by which the member 7 and piston 5 may be translated to vary the capacitance of the capacitor. Calibration adjustments may be made by means of the screw stud 6, 6a.

A spring 9, in the form of a continuous toroid coil is compressed laterally between the fitting 1 and the piston 5, as best seen in FIG. 2. A sleeve 10, of electrically conductive material is inserted within the fitting 1, with its inner end spaced from the right hand end of the dielectric tube 2 by a distance sufficient to receive the compressed spring 9 with slight clearance. The sleeve 10 is soldered to the fitting 1 at the right hand end of the fitting.

The stationary electrode 3 is connected, as by soldering, to a wire 11 which serves as an electrical terminal of the capacitor. Another wire 12, is connected by soldering to the flange 1b, and serves as the other electrical terminal of the capacitor.

It may be observed that in any axial position of the piston 5, the spring 9 provides a multiplicity of electrical connections between the piston and the fitting 1, which electrical connections are evenly distributed about the entire periphery of the piston. While the contacting engagements between the turns of the spring and the surfaces of the piston and the fittings are positive, the spring pressure is nevertheless light at all points of contact. The electrical connection between the piston 5 and the mounting flange 1b is short and direct and does not change in dimensions with variations in the piston position. The shortness of this path and the wide distribution of the contact ensure that the connection to the piston 5 has a very low resistance.

The dielectric tube 2 and the sleeve 10 cooperate to maintain a fixed spacing between the piston 5 and the stationary electrode 3, and another fixed spacing between the piston 5 and the inner surface of the fitting 1. The latter spacing, which is the spacing into which the spring 9 is compressed, must be smaller than the outside helix diameter H (see FIG. 3) of the spring 9 when the latter is in an unstressed condition. The dielectric tube 2 and the sleeve 10 also cooperate to guide the movements of the piston 5, inasmuch as they together form a cylindrical passage through which the piston moves.

The inside toroid diameter $T_i$ (see FIG. 3) should be smaller than the diameter of the piston 5 so that the spring 9 is stretched around the piston. The outside diameter $T_o$ (see FIG. 3) should be greater than the inside diameter of the fitting 1. The diameter of the wire forming the spring is designated W in FIG. 3.

While it is preferred to use a single continuous spring as the electrical connector between the piston 9 and the cylinder 1, it is alternatively possible to use several spring sections.

While the invention is illustrated as applied to a connector between inner and outer cylindrical conductive elements, the invention in its broader aspects could be applied to conductive elements of other contours. For example, the two elements could have plane facing conductive surfaces. The movable element should have a surface of substantial dimension in the direction of its movement and should also have a substantial dimension transverse to the path of movement. The stationary element should have a surface transverse to the path of movement of at least substantially the same dimension as the dimension of the movable element in that direction. Guide means must be provided to maintain a predetermined spacing between the surfaces of the two elements which is smaller than the unstressed outside helix diameter of the spring connector. The spring should have its helix axis transverse to the path of movement and of substantially the same transverse dimension as the electrode surface. In a device so constructed, all the turns of the helix resiliently engage both of the surfaces and provide an electrical connection consisting of a multiplicity of parallel paths distributed through the transverse dimension of the electrode surface.

While I have shown and described a preferred embodiment of my invention, other modifications thereof will readily occur to those skilled in the art, and I therefore intend my invention to be limited only by the appended claim.

I claim:

An ultra high frequency tuning capacitor comprising:
(a) a stationary, electrically conductive mounting element having a passage therein defined by a cylindrical wall;
(b) a stationary, elongated tubular dielectric element coaxial with said passage and having an end portion extending within said passage;
(c) a cylindrical electrode movable within said dielectric element and coaxial therewith;
(d) a stationary hollow electrode encircling said dielectric element and spaced longitudinally thereof from said mounting element;
(e) spring means of electrically conductive material in the form of a toroid coil having an unstressed outside helix diameter greater than the spacing between the movable electrode and the wall, said spring means encircling the movable electrode adjacent to said end portion of said dielectric element and being compressed between said cylindrical wall and the movable electrode so that the turns of the coil resiliently engage the wall and the movable electrode and form a circumferentially distributed electrical connection therebetween; and
(f) stationary collar means disposed within said passage and longitudinally adjacent to said spring means for holding said spring means against substantial longitudinal movement so as to prevent any change in the reactance of the electrical connection between the wall and the movable electrode caused by movement of the movable electrode.

References Cited by the Examiner

UNITED STATES PATENTS

| 2,137,435 | 11/1938 | Yolles | 317—249 X |
| 2,922,093 | 1/1960 | Kellerman | 317—249 |
| 3,087,038 | 4/1963 | Bethke | 339—255 X |

FOREIGN PATENTS 1,128,046   4/1962   Germany.

LARAMIE E. ASKIN, *Primary Examiner.*

JOHN F. BURNS, *Examiner.*

D. J. BADER, *Assistant Examiner.*